United States Patent [19]

Suzuki et al.

[11] Patent Number: 5,060,216
[45] Date of Patent: Oct. 22, 1991

[54] TRACKING CONTROL SYSTEM FOR USE IN AN OPTICAL READING APPARATUS

[75] Inventors: Toshio Suzuki; Mitsuru Nishitsuka, both of Tokorozawa, Japan

[73] Assignee: Pioneer Electronic Corporation, Tokyo, Japan

[21] Appl. No.: 591,176

[22] Filed: Oct. 1, 1990

[30] Foreign Application Priority Data

Apr. 25, 1990 [JP] Japan .................................. 2-109377

[51] Int. Cl.$^5$ .............................................. G11B 7/00
[52] U.S. Cl. .............................. 369/44.41; 369/44.14; 250/201.5
[58] Field of Search .... 369/44.41, 44.42, 44.34–44.39, 369/124, 109, 32, 44.14; 250/201.4, 201.5

[56] References Cited

U.S. PATENT DOCUMENTS

| | | | |
|---|---|---|---|
| 4,005,163 | 4/1991 | Yamamoto et al. | 369/44.36 |
| 4,410,969 | 10/1983 | Maeda | 369/44.41 |
| 4,467,462 | 8/1984 | Shibata | 369/44.41 |
| 4,525,825 | 6/1985 | Ito et al. | 369/44.41 |
| 4,992,652 | 2/1991 | Okada | 369/44.41 |
| 4,998,234 | 3/1991 | Rees et al. | 369/44.41 |
| 4,998,235 | 3/1991 | Ichibashi et al. | 369/44.41 |

Primary Examiner—Roy N. Envall, Jr.
Assistant Examiner—Thang V. Tran
Attorney, Agent, or Firm—Sughrue, Mion, Zinn, Macpeak & Seas

[57] ABSTRACT

In the tracking control unit of an optical information reading apparatus to perform "Heterodyne Method", electric signals from the respective quadrant-separated subdetectors are inputted to a first adder to obtain a reference sum total signal whose phase is 0°. Regarding phase difference, the sum total signal is compared with a first electric signal from an arbitrary one of the quadrant-separated subdetectors and a second electric signal from the other of the subdetectors located in the diagonal relationship with respect to the arbitrary subdetector, respectively, to produce a first and a second phase compared result signals which are added to each other by a second adder whereby a precise tracking control can be attained irrespective of the existence of any scratch or stain.

6 Claims, 9 Drawing Sheets

FIG. 3
SCANNING DIRECTION OF LASER LIGHT
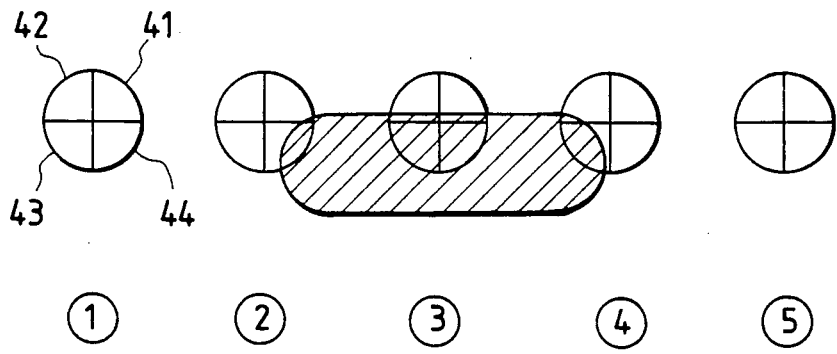
FIG. 5
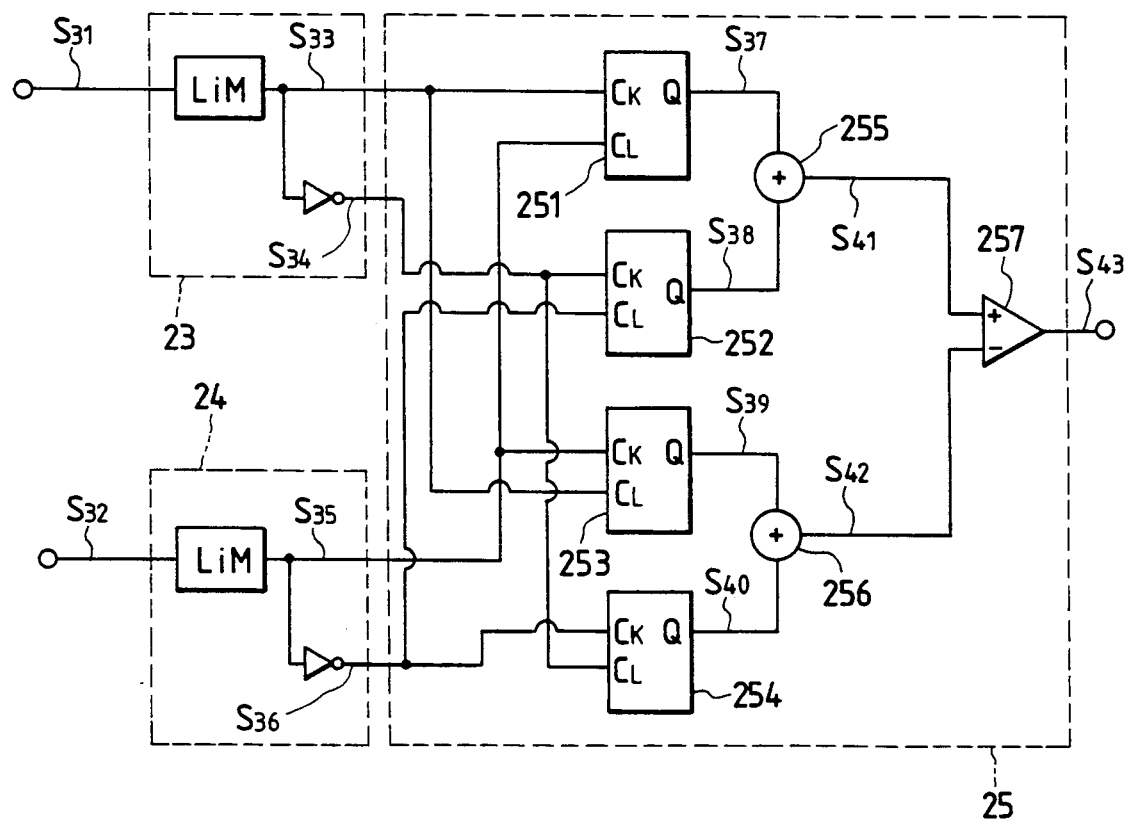

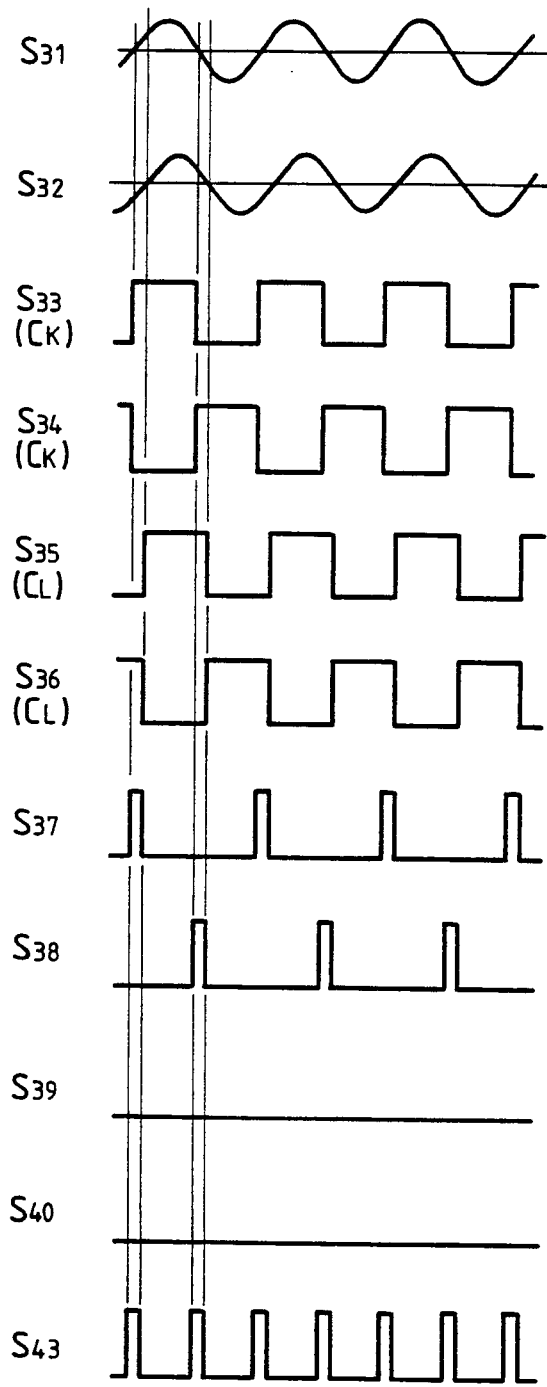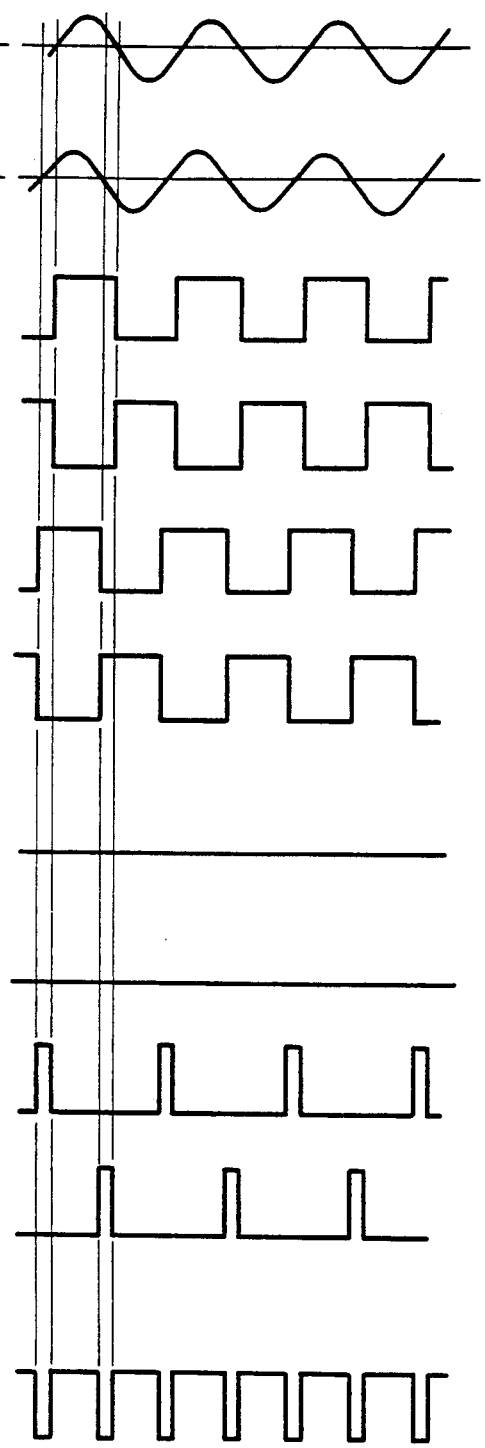

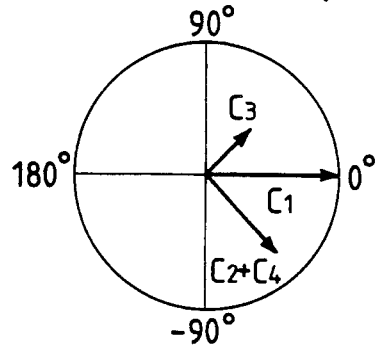
FIG. 10(III)

TRACKING CONTROL SYSTEM FOR USE IN AN OPTICAL READING APPARATUS

BACKGROUND OF THE INVENTION

This invention relates to an optical information reading apparatus such as an optical disk player, etc., and more particularly to an optical information reading apparatus in the form of an employment of a single light beam to conduct a tracking servo control utilizing interference of a reflected and diffracted light thereof.

In optical information reading apparatus such as a laser vision disk (LVD) player system, a compact disk (CD) player system, or a Direct Read After Write (DRAW) optical disk system, etc., a tracking control is used in order to precisely trace pits on the disk. As this tracking control system, various systems are proposed. As one of these systems, there is a method of detecting tracking information included in a transmitted light or a reflected light from the disk of a single light beam irradiated onto the disk in place of using a beam exclusive for tracking in addition to a beam for recording and playing back information.

The optical information reading apparatus using this tracking control system comprises a light emitting unit including a laser diode, etc., a light receiving unit including a quadrant-separated type photo detector, etc. and a signal processing unit. A laser beam emitted from the light emitting unit is reflected and diffracted by information recording pits on the optical disk, and is then incident to the light receiving unit. In the light receiving unit, respective subdetectors of the quadrant-separated type photo detector transform the incident light to electric signals. The signal processing unit makes a comparison between sum of electric signals from a pair of subdetectors in one diagonal direction and sum of electric signals from a pair of subdetectors in the other diagonal direction to detect the direction of a phase shift therebetween, i.e., discrimination between lead and lag of phase, and a quantity of shifts thereof. Thus, the signal processing unit makes a correction or modification in a direction opposite to the polarity (±) of this shift and of a quantity equal to the quantity of shifts, thereby making it possible to conduct a tracking control.

However, in the above-described conventional optical reading apparatus, since there is employed the system of detecting a phase difference between sum signals of output signals in diagonal directions of the quadrant-separated photo detector, there was the problem that where there is any scratch or stain on the surface of the optical disk, deviation may take place on the track.

Namely, it is considered that when a laser beam is passed through a scratched or stained portion on the surface of the optical disk, light quantity is partially or entirely reduced by such a scratch or stain on the quadrant-separated photo detector.

For this reason, although there is no deviation between a laser beam and a track, a seeming tracking error signal is outputted, deviation takes place on the track.

SUMMARY OF THE INVENTION

An object of this invention is to provide an optical reading apparatus including a tracking servo unit capable of precisely detecting a tracking control signal even if there exists any scratch or stain on the surface of an optical disk.

In accordance with a preferred embodiment of this invention, an optical information reading apparatus comprises light beam irradiation means, photo detector means, and tracking control means. The photo detector means includes quadrant-separated subdetectors. Further, the tracking control means includes a first adder, a first phase comparator, a second phase comparator, a second adder, and an actuator.

The light beam irradiation means irradiates a light beam onto a signal track on the information recording surface of an information recording medium. This light beam is reflected on the information recording surface and is incident to the photo detector means as a reflected light beam. The photo detector means applies photoelectric conversion to the reflected light beam to output electric signals.

The first adder in the tracking control means extracts a sum total signal of electric signals outputted from the quadrant-separated subdetectors of the photo detector means to output it to the first and second phase comparators.

The first phase comparator makes a phase comparison between a first electric signal outputted from either of a pair of subdetectors located at diagonal positions of the quadrant-separated subdetectors of the photo detector and a sum total signal to output it as a first phase compared result signal to the second adder.

On the other hand, the second phase comparator makes a phase comparison between a second electric signal outputted from the other of a pair of subdetectors located at diagonal positions of the quadrant-separated subdetector of the photo detector means and a sum total signal to output it as a second phase compared result signal to the second adder. The second adder adds the first and second phase compared result signals to output it as a tracking control signal to the actuator. Thus, the actuator moves the position of the light beam irradiation means by the tracking control signal so that the light beam precisely follows a signal track to correct a tracking error.

BRIEF DESCRIPTION OF THE DRAWINGS

FIG. 3 is a model view showing the relationship between the position of information recording pits and a laser light spot, and a light intensity distribution of respective subdetectors of the quadrant-separated photo detector, FIGS. 4(A) and 4(B) are signal waveform diagrams for explaining the operation of a tracking control by the time lag method, FIG. 5 is a view showing the configuration of a phase comparator in the prior art.

DESCRIPTION OF THE PREFERRED EMBODIMENTS

General description

Prior to the description of a preferred embodiment of this invention, an optical information reading apparatus will be generally described.

Figure 1:
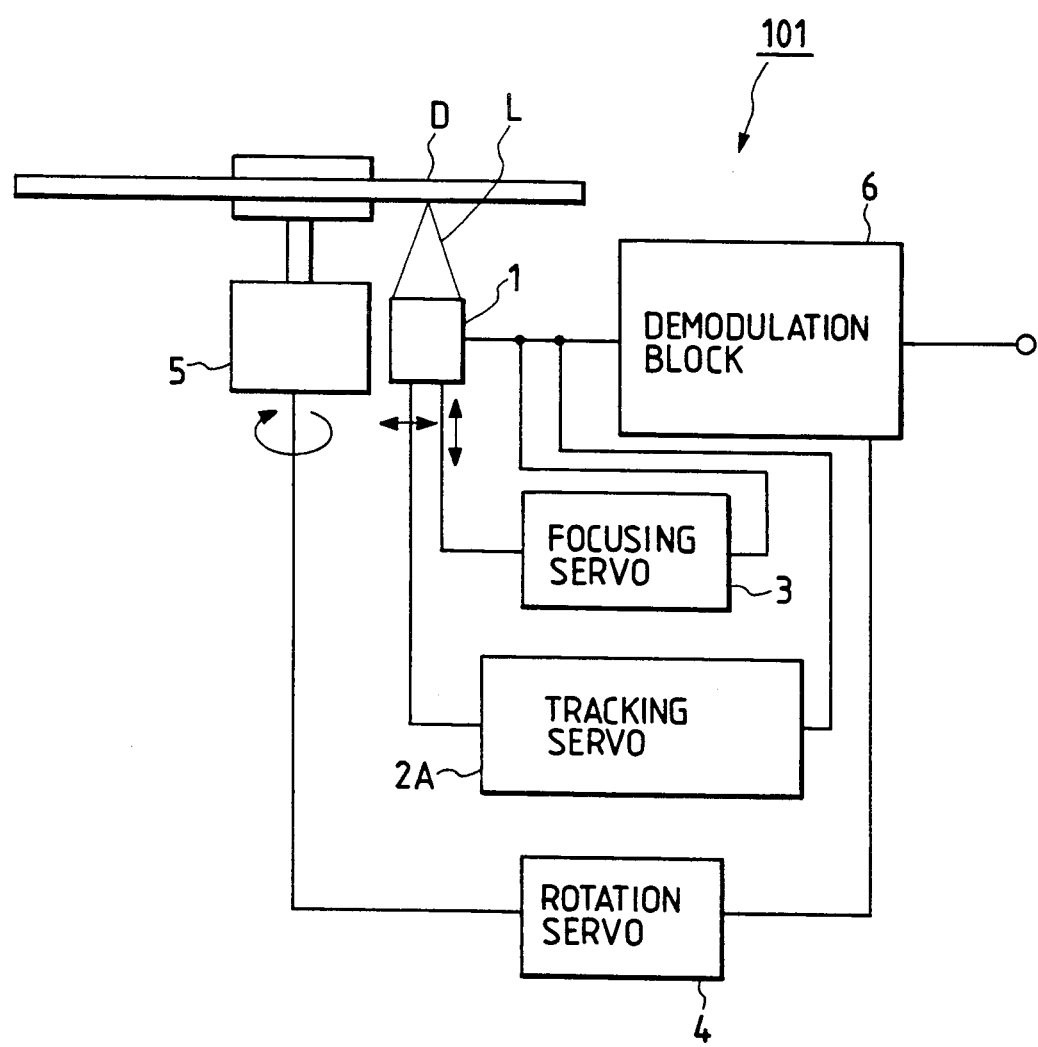
FIG. 1 is a schematic block diagram of a conventional optical information reading apparatus.

FIG. 1 shows a schematic block diagram of a typical optical information reading apparatus.

This optical information reading apparatus 101 comprises an optical pickup unit 1 for reading out information recorded in the form of a modulated signal on an optical disk D using a laser light L while rotating the optical disk D, a demodulation block 6 for demodulating the modulated signal thus read out to output it, a spindle motor 5 for rotating the optical disk D, a tracking servo unit 2A for effecting a control such that a laser light L from the optical pickup unit 1 does not deviate from a track, a focusing servo unit 3 for carrying out a focusing servo control of the laser light L of the optical pickup unit 1, and a rotation servo unit 4 for controlling the spindle motor 5 so that it rotates at a constant speed.

Figure 2:
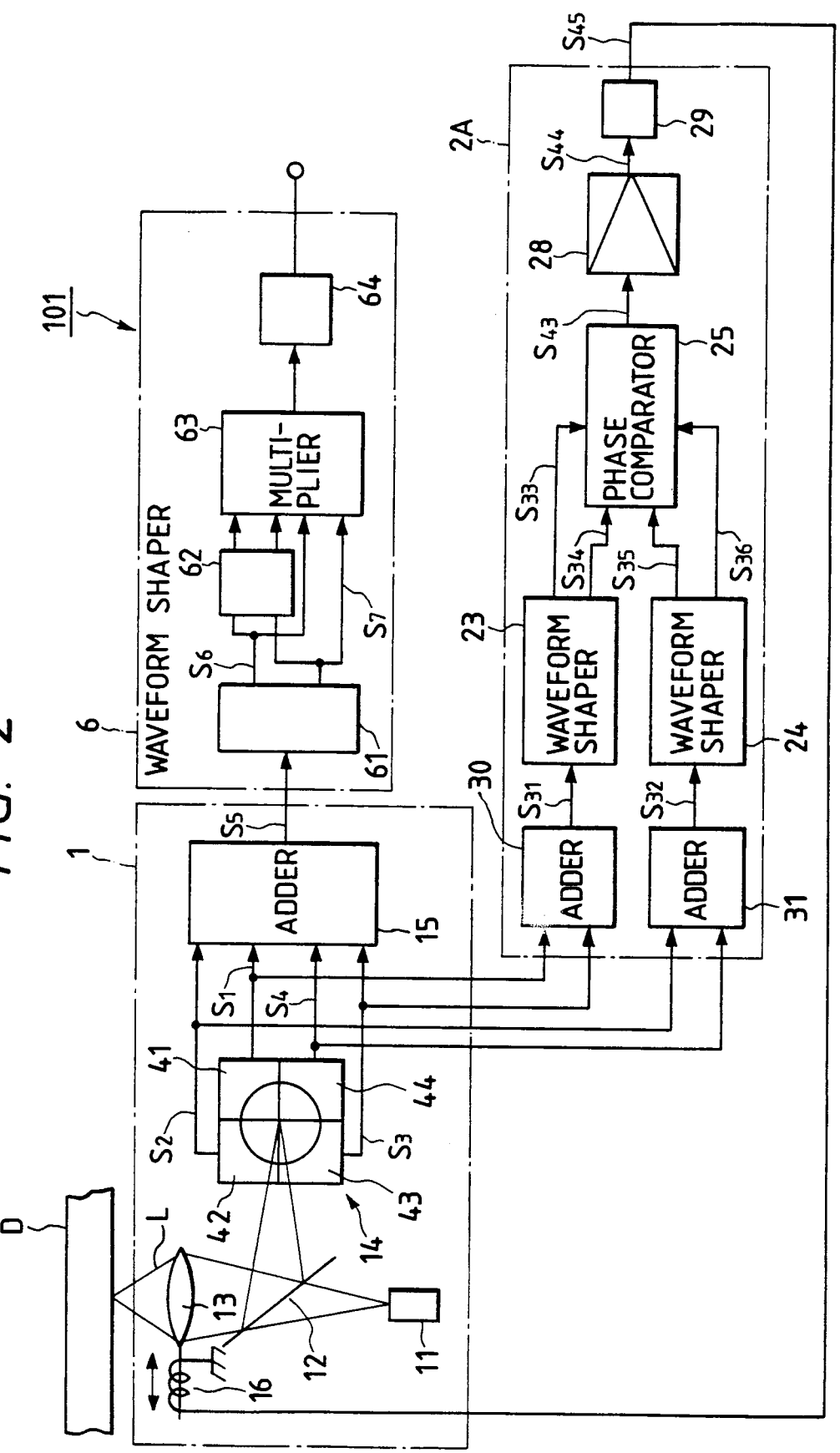
FIG. 2 is a block diagram showing the configuration of the conventional optical information reading apparatus.

FIG. 2 shows a block diagram illustrating a further detailed configuration of the optical pickup unit 1, the tracking servo unit 2A, and the demodulation block 6 in the form of conducting a tracking servo using a single beam.

In FIG. 2, the optical pickup unit 1 comprises a light detector 11 such as a laser diode, etc., a half-mirror 12 and an object lens 13 on the optical axis of a laser, a quadrant-separated photo detector 14 such as a photo diode, etc. including four subdetectors 41 to 44, an adder 15, and an actuator coil 16 for tracking.

Further, the tracking servo unit 2A comprises adders 30 and 31, waveform shaping circuit 23 and 24, a phase comparator 25, an amplifier 28 including an integrator, and an equalizing amplifier 29.

In addition, the demodulation block 6 comprises a waveform shaping circuit 61, a delay circuit 62, a multiplier 63, and a detecting filter 64.

The operation of the conventional optical information reading apparatus will now be described with reference to FIG. 2.

A laser light L emitted from the laser light generator 11 is transmitted through the half-mirror 12, and is focused onto information recording pits on the optical disk D by the object lens 13. The laser light L is reflected on the recording surface of the optical disk D. This reflected light is transmitted through the object lens 13. The reflected light undergoes in turn a processing such that its optical path is charged by the half-mirror 12. Then, it is irradiated onto subdetectors 41, 42, 43 and 44 of the quadrant-separated photo detector 14 and is subjected to photoelectric conversion. It is now assumed that photoelectric converted output signals corresponding to light quantities of respective subdetectors 41, 42, 43 and 44 of the quadrant-separated photo detector 14 are referred to as light output signals $S_1$, $S_2$, $S_3$ and $S_4$, respectively. These light output signals $S_1$, $S_2$, $S_3$ and $S_4$ are inputted to the adder 15. Thus, a RF (Radio Frequency) signal $S_5$ is outputted therefrom. In this case, the following relationship holds:

$$S_5 = S_1 + S_2 + S_3 + S_4.$$

$S_5$ is also referred to as a sum total signal.

Further, light output signals $S_1$ and $S_3$ are inputted to the adder 30, and is outputted therefrom as an diagonal sum signal $S_{31}$. In this case, the following relationship holds:

$$S_{31} = S_1 + S_3.$$

On the other hand, light output signals $S_2$ and $S_4$ are inputted to the adder 31, and is outputted therefrom as the diagonal sum signal $S_{32}$. In this case, the following relationship holds:

$$S_{32} = S_2 + S_4.$$

The sum total signal $S_5$ is demodulated by the demodulation block 6, and is outputted therefrom as an information signal such as a voice or video signal.

The positional relationship between information recording pits on the optical disk D and spots of a laser light, and the light intensity distribution of respective subdetectors of the quadrant-separated photo detector are shown in FIG. 3 in a model form. When a spot of a laser light indicated by circle is scanned in a direction indicated by the arrow on the figure, influences of diffraction by the information recording pits appear on respective subdetectors 41 to 44 with time lag therebetween. Namely, when the laser light spot is in the state of 1, a reflected light is uniformly irradiated on subdetectors 41 to 44. In the state of 2, the subdetector 44 first undergoes the influence of diffraction of pits. In the state of 3, subdetectors 43 and 44 both undergo the influences of diffraction of pits. In the state of 4, the subdetector 43 undergoes the influence of diffraction of pits. For this reason, the diagonal sum signals $S_{31} = S_1 + S_3$ and $S_{32} = S_2 + S_4$ produce a phase difference therebetween as shown in FIG. 12. FIG. 4(A) shows the case where the phase of $S_{31}$ leads, and FIG. 4(B) shows the case where the phase of $S_{32}$ leads. Which phase leads is determined depending upon the direction of shift with respect to the track of the spot of the laser light. The quantity of this phase difference corresponds to a quantity of tracking error, and whether the phase difference indicates either "lead" or "lag" corresponds to the direction of a shift of tracking.

Accordingly, if the polarity and the quantity of a phase shift between diagonal sum signals $S_{31}$ and $S_{32}$ is given, a tracking servo control can be carried out by making a modification of the same quantity as the above in a direction opposite to that polarity. The tracking control of this system is called "time lag method or heterodyne method". In accordance with the time lag method, an approach is employed to respectively input diagonal sum signals $S_{31}$ and $S_{32}$ to waveform shaping circuits 23 and 24 using a limiter, and a comparator, etc. to generate pulse signals $S_{33}$ and $S_{35}$ to further generate inverted pulse signals $S_{34}$ and $S_{36}$ of the pulse signals (FIG. 4). These signals $S_{33}$ and $S_{36}$ are inputted to the phase comparator 25. The phase comparator 25 comprises, as shown in FIG. 5, four D-type flip-flop circuits 251, 252, 253 and 254, adders 255 and 256, and a differential amplifier 257. The pulse signals $S_{33}$ and $S_{35}$ and the inverted pulse signals $S_{34}$ and $S_{36}$ are delivered to the clock input $C_K$ and the clear pulse input $C_L$ of the D-type flip-flop circuits 251 to 254, respectively. As shown in FIG. 4, the Q output signals $S_{37}$, $S_{38}$, $S_{39}$ and $S_{40}$ become pulse signals detected at the both edges of the pulse signals and the inverted pulse signals. These signals correspond to the direction of lead or lag and a shift quantity of the phase. They are added by adders 255 and 256. Their outputs thus obtained are inputted to the differential amplifier 257. Thus, an output as a phase difference signal $S_{43}$ as shown in FIG. 4 is provided therefrom.

This phase difference signal $S_{43}$ is inputted to the amplifier 28, at which it is integrated and amplified. Thereafter, an output as a signal $S_{44}$ is provided therefrom. This signal $S_{44}$ is inputted to the equalize amplifier 29. An output signal $S_{45}$ from the equalize amplifier 29 is inputted to the tracking coil 16 as a tracking control signal. Thus, tracking control of a laser light is carried out. As stated above, in the case of the conventional tracking servo, a method was adopted to detect a signal phase difference between the diagonal sum signals $S_1+S_3$ and $S_2+S_4$ to use this phase difference as a tracking control signal. However, at the time of an optimum tracking, where a laser light is passed through a scratched or stained portion on the disk surface, so a light quantity at the half portion on one side is reduced as indicated by hatched portions in FIG. 6, the phase difference between the diagonal sum signals $S_1+S_3$ and $S_2+S_4$ does not become equal to zero, but any error occurs. Accordingly, although there is no deviation between the laser light and the track, a seeming track error signal is outputted. Thus, a tracking error may take place.

Outline of the Configuration and the Operation

Figure 7:
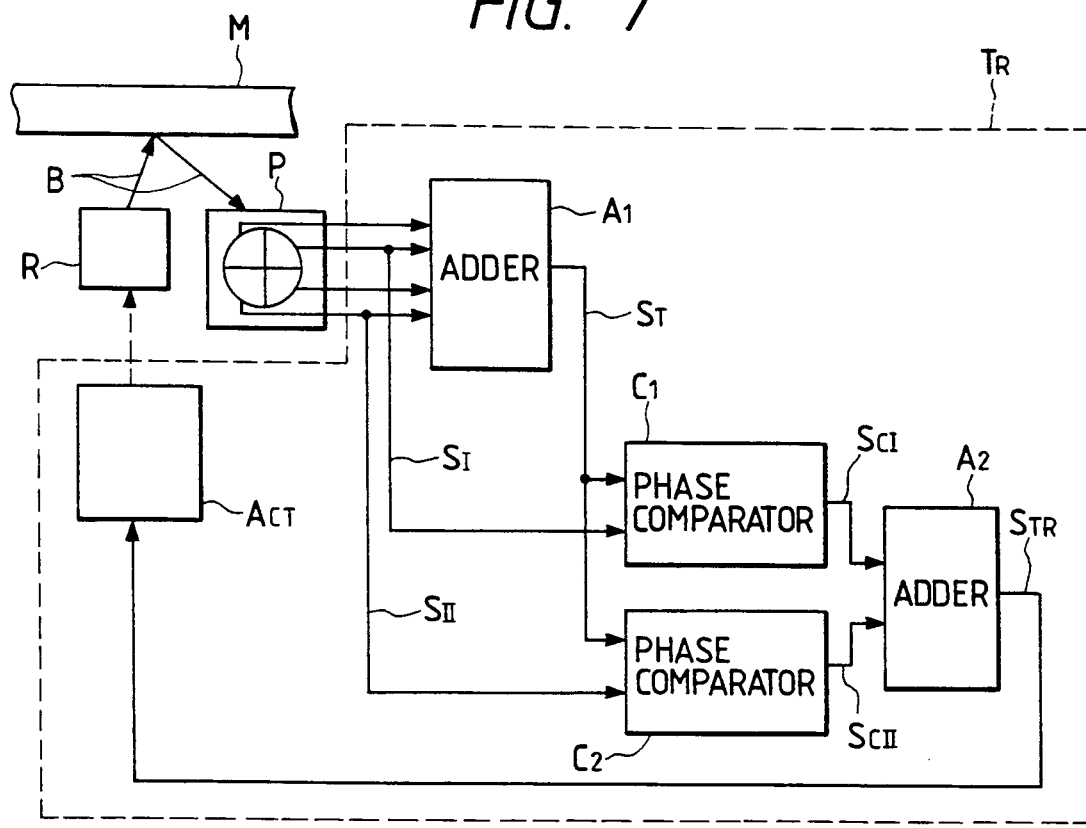
FIG. 7 is a view showing the configuration of a basic embodiment of this invention.

The outline of the configuration of an optical information reading apparatus according to this invention is shown in FIG. 7. This optical information reading apparatus comprises, as shown in FIG. 7, light beam irradiation means R, photo detector means P, and tracking control means $T_R$. The photo detector means P includes quadrant-separated subdetectors. Further, the tracking control means $T_R$ includes a first adder $A_1$, a second adder $A_2$, a first phase comparator $C_1$, a second phase comparator $C_2$ and an actuator $A_{CT}$.

The outline of the apparatus shown in FIG. 7 will now be described.

The light beam irradiation means R irradiates a light beam B onto a signal track on the information recording surface of an information recording medium M. This light beam B is reflected on the information recording surface, and is then incident to the photo detector means P as a reflected light beam. The photo detector means P applies a photoelectric conversion to the reflected light beam to output electric signals.

The first adder $A_1$ in the tracking control means $T_R$ extracts a sum total signal $S_T$ of electric signals outputted from the quadrant-separated subdetectors of the photo detector means P to output it to the first and second phase comparators $C_1$ and $C_2$.

The first phase comparator $C_1$ makes a phase comparison between a first electric signal $S_I$ outputted from either of a pair of subdetectors located at diagonal positions of the quadrant-separated subdetectors of the photo detector means P and a sum total signal $S_T$ to output it as a first phase compared result signal $S_{CI}$ to the second adder $A_2$.

On the other hand, the second phase comparator $C_2$ makes a phase comparison between a second electric signal $S_{II}$ outputted from the other of a pair of subdetectors located at diagonal positions of the quadrant-separated subdetector of the photo detector means P and the sum total signal $S_T$ to output it as a second phase compared result signal $S_{CII}$ to the second adder $A_2$. The second adder $A_2$ adds the first and second phase compared result signals $S_{CI}$ and $S_{CII}$ to output it as a tracking control signal $S_{TR}$ to the actuator $A_{CT}$. Thus, the actuator $A_{CT}$ moves the position of the light beam irradiation means R by the tracking control signal $S_{TR}$ so that the light beam B precisely follows a signal track to correct a tracking error.

Detailed Configuration and the Operation

Figure 8:
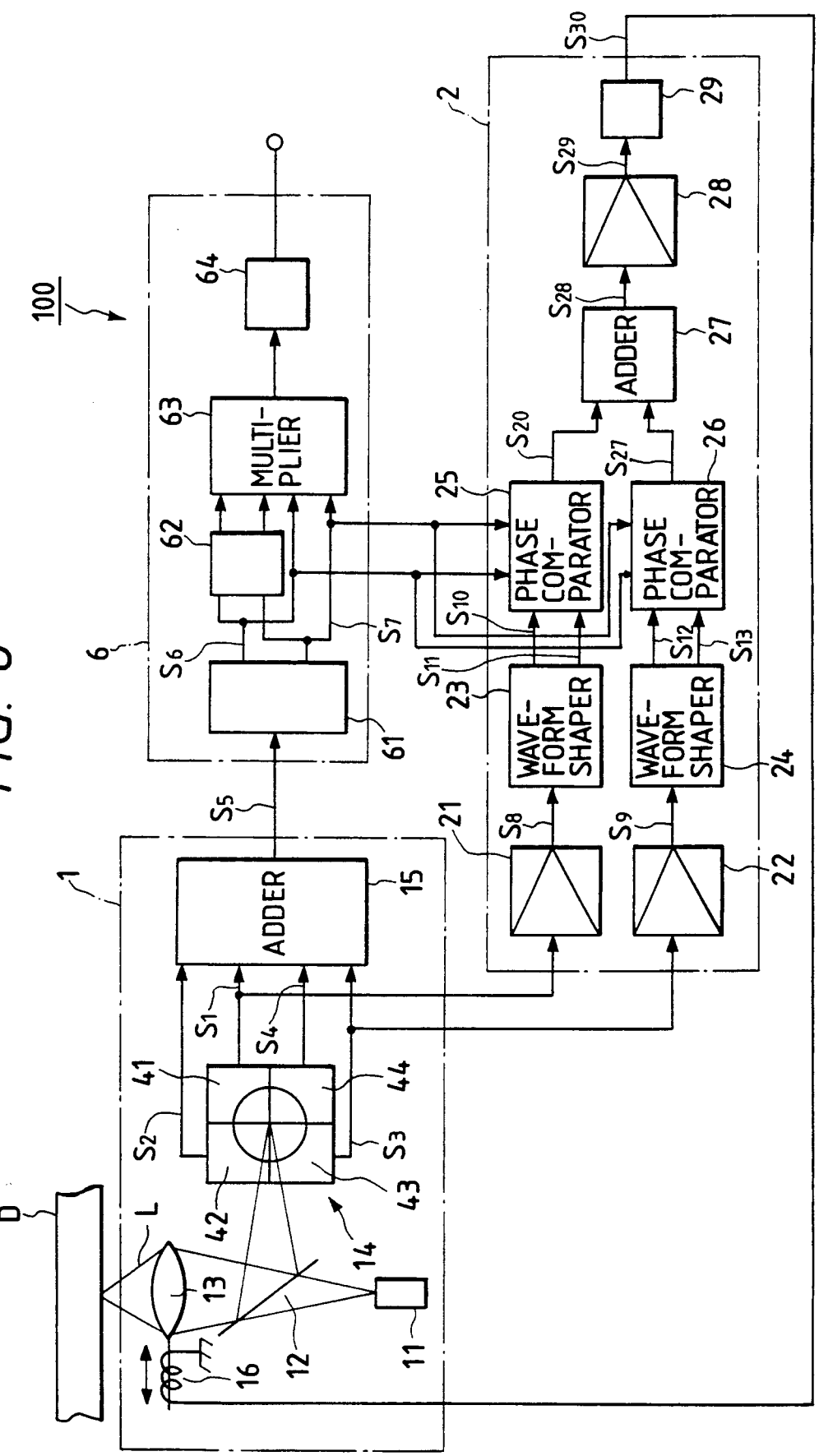
FIG. 8 is a block diagram showing the configuration of another embodiment of an optical information reading apparatus of this inventioin.

The detailed configuration of an optical information reading apparatus according to this inventioin is shown in FIG. 8.

FIG. 8 shows the optical pickup unit 1, the tracking servo unit 2, and the demodulation block 6.

The optical pickup unit 1 comprises a light generator 11 such as a laser diode, etc., a half-mirror 12 and an object lens 13 on the optical axis of a laser light, a quadrant-separated photo detector 14 such as a photo diode, etc. including four subdetectors 41 to 44, an adder 15, and an actuator coil 16 for tracking.

Further, the tracking servo unit 2 comprises amplifiers 21 and 22, waveform shaping circuits 23 and 24, phase comparators 25 and 26, an adder 27, an amplifier 28 including an integrator, and an equalizing amplifier 29.

In addition, the demodulation block 6 comprises a limiter 61, a delay circuit 62, a multiplier 63, and a detecting filter 64.

The laser diode 11 and the object lens 13 constitute light beam irradiation means. Further, the half mirror 12 and the quadrant-separated photo detector 14 constitute photo detector means. The adder 15, the limiter 61, the tracking servo unit 2, and the tracking coil 16 constitute tracking control means.

In additiion, the phase comparator 25 constitutes the first phase comparator, and the phase comparator 26 constitutes the second phase comparator.

The operation of the optical information reading apparatus of this invention will now be described with reference to FIG. 8.

A laser light L emitted from the laser generator 11 is transmitted through the half-mirror 12, and is focused onto information recording pits on the optical disk D. The laser light L is reflected on the recording surface of the optical disk D. This reflected light is transmitted through the object lens 13. The reflected light undergoes in turn a processing such that its optical path is changed by the half-mirror 12. Then, it is irradiated onto subdetectors 41, 42, 43 and 44 of the quadrant-separated photo detector 14 and is subjected to photoelectric conversion. It is now assumed that photoelectric converted output signals corresponding to light quantities of respective subdetectors 41, 42, 43 and 44 of the quadrant-separated photo detector 14 are referred to as light signals $S_1$, $S_2$, $S_3$ and $S_4$, respectively. These light output signals $S_1$, $S_2$, $S_3$ and $S_4$ are inputted to the adder 15. Thus, a RF (Radio Frequency) signal $S_5$ is outputted therefrom. In this case, the following relationship holds:

$$S_5 = S_1 + S_2 + S_3 + S_4.$$

The signal expressed as $S_5 = S_1 + S_2 + S_3 + S_4$ is referred to as a sum total signal hereinafter.

The light output signal $S_1$ is inputted to the amplifier 21, and is amplified so that the signal $S_1$ has a predetermined level. The signal thus obtained is outputted as an amplified signal $S_8$ to the waveform shaping circuit 23 using a limiter, and a comparator, etc. The waveform shaping circuit 23 outputs the amplified signal $S_8$ as the pulse signal $S_{10}$ and the inverted pulse signal $S_{11}$ to the input terminal of the phase comparator 25.

On the other hand, the sum total signal $S_5$ is demodulated by the demodulation block 6 and is outputted as an information signal such as a voice or video signal. The sum total signal $S_5$ is first inputted to the waveform shaping circuit 61, and is outputted as the pulse signal $S_6$ and the inverted pulse signal $S_7$. The pulse signal $S_6$ and the inverted pulse signal $S_7$ are both inputted to the phase comparator 25. The phase comparator 25 outputs a phase difference signal $S_{20}$ indicative of a phase difference between the sum total signal $S_5$ and the light output signal $S_1$.

Further, the light output signal $S_3$ is inputted to the amplifier 22 and is amplified so that it has a predetermined level. The signal thus obtained is outputted as an amplified signal $S_9$ to the waveform shaping circuit 24. The waveform shaping circuit 24 outputs the amplified signal $S_9$ as the pulse signal $S_{12}$ and the inverted pulse signal $S_{13}$ to the phase comparator 26.

On the other hand, the pulse signal $S_6$ and the inverted pulse signal $S_7$ are both inputted from the demodulation block 6 to the phase comparator 26. The phase comparator 26 outputs a phase difference signal $S_{27}$ indicative of a phase difference between the sum total signal $S_5$ and the light output signal $S_3$.

Figure 14:
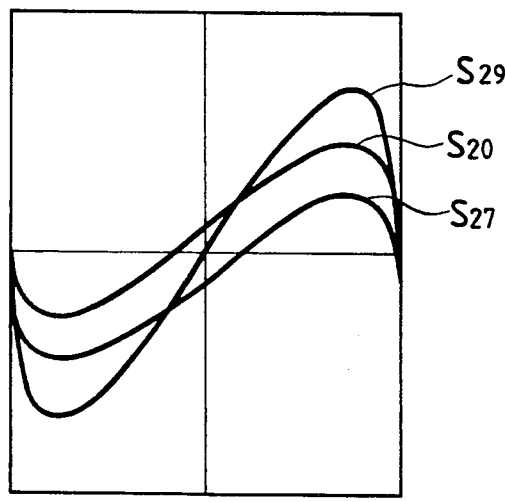
FIG. 14 is a diagram showing a phase difference signal and a tracking control signal in this invention.

These phase difference signals $S_{20}$ and $S_{27}$ are inputted to the adder 27, and is outputted as a sum signal $S_{28}$ to the amplifier 28. This sum signal is integrated and amplified by the amplifier 28. The signal thus amplified is then outputted as a signal $S_{29}$ to the equalize amplifier 29. This signal $S_{29}$ is equalized by the equalize amplifier 29, and is then outputted as a tracking control signal $S_{30}$. This tracking control signal $S_{30}$ is inputted to the actuator coil 16 for tracking to carry out a tracking control of a laser light. The waveforms of the phase difference signals $S_{20}$ and $S_{27}$ and the signal $S_{29}$ are shown in FIG. 14.

Figure 9:
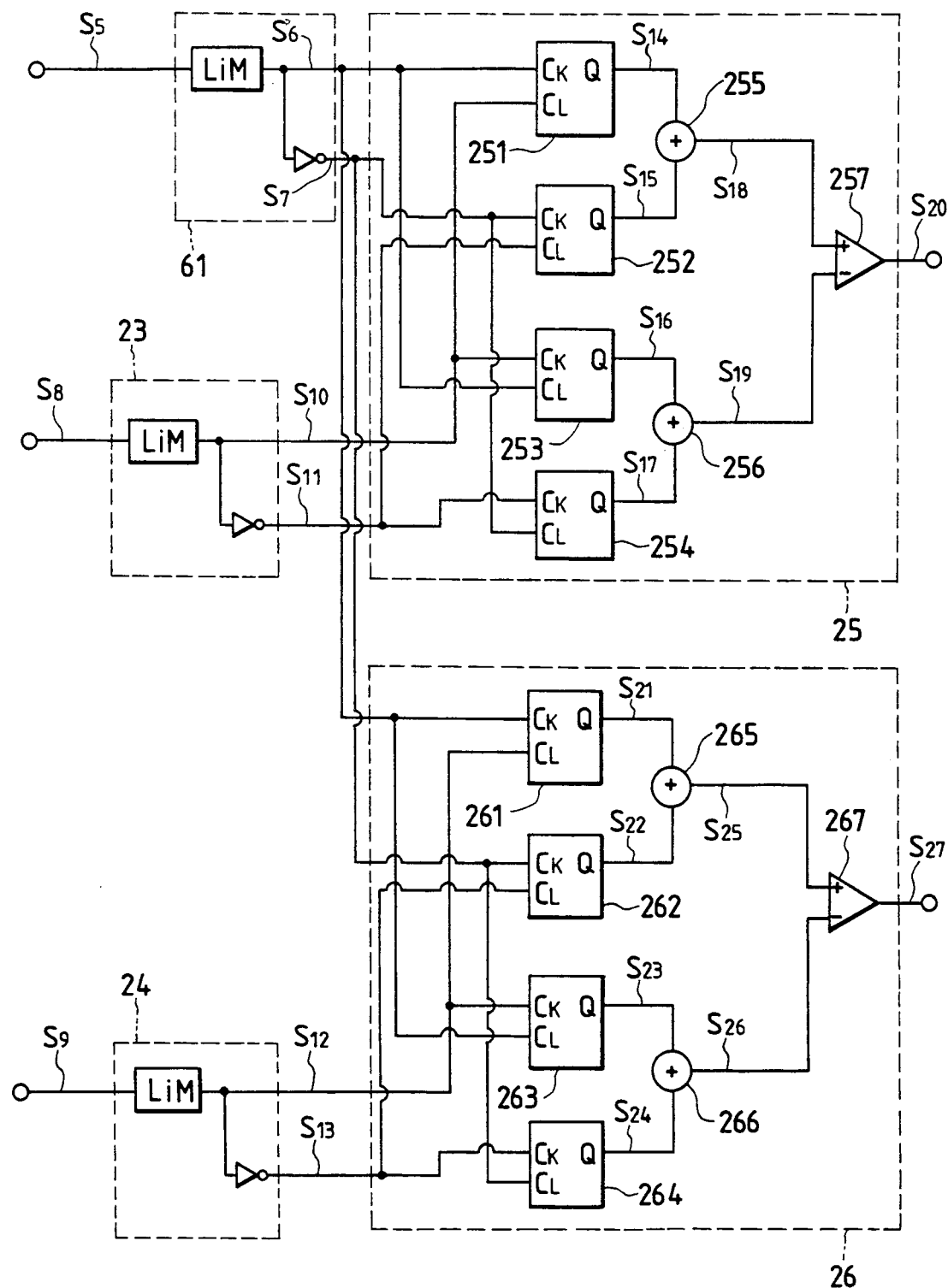
FIG. 9 is a view showing the configuration of first and second phase comparators in this invention, FIGS. 10 (I to VI) are vector diagrams showing light output signals of respective subdetectors of the quadrant-separated photo detector in an optimum tracking state, respectively.

Examples of the phase comparators 25 and 26 are shown in FIG. 9.

The first phase comparator 25 comprises four D-type flip-flop circuits 251, 252, 253 and 254, adders 255 and 256, and a differential amplifier 257. Further, the second phase comparator 26 comprises four D-type flip-flop circuits 261, 262, 263 and 264, adders 265 and 266, and a differential amplifier 267. The pulse signals $S_6$ and $S_{10}$ and the inverted pulse signals $S_7$ and $S_{11}$ are delivered to the clock input $C_K$ and the lcear pulse input $C_L$ of the D-type flip-flop circuits 251 to 254, respectively. The Q output signals $S_{14}$, $S_{15}$, $S_{16}$ and $S_{17}$ are added by the adders 255 and 256. Their outputs $S_{18}$ and $S_{19}$ are inputted to the differential amplifier 257, and is outputted therefrom as a phase difference signal $S_{20}$. The pulse signals $S_6$ and $S_{12}$ and the inverted pulse signals $S_7$ and $S_{13}$ are delivered to the clock input $C_K$ and the clear pulse input $C_L$ of the D-type flip-flop circuits 261 to 264, respectively. The Q output signals $S_{21}$, $S_{22}$, $S_{23}$ and $S_{24}$ are added by the adders 265 and 266. Their outputs $S_{25}$ and $S_{26}$ are inputted to the differential amplifier 267, and is outputted as a phase difference signal $S_{27}$.

The operation of this invention will now be described in more detail.

It is considered that light intensity modulation on the quadrant-separated photo detector 14 is caused by superposition of diffracted light rays subjected to diffraction by information recording pits on the optical disk D. It is now assumed that parameters indicative of the zero-order diffracted light and the first-order diffracted light are as follows:

$\phi$ = phase difference between the zero-order light and the first-order light by pit configuration, $\Delta T_o$ = phase difference between the zero-order diffracted light and the first-order light by a tracking error.

$\omega t$ = phase difference between the zero-order diffracted light and the first-order light by movement in a tangential direction ($\omega$ represents each frequency of the RF signal, and represents a time.)

$\Delta T_o$ changes in a range of 0 to $2\pi$ time one track is shifted, and $\omega t$ changes in a range of 0 to $2\pi$ every time a diffracted light goes across one pit. For a time period during which the focusing servo is in operation, the zero-order diffracted light and the first-order diffracted light overlap with each other. At this time, values of the light output signals $S_1$ to $S_4$ of respective subdetectors are given as follows:

$$S_1 = C_1 \cos \omega t + C_2 \cos(\omega t + \phi) + C_3 \cos(\omega t - \phi) + C_4 \cos(\omega t - \Delta T_o + \phi) \quad (1)$$

$$S_2 = C_1 \text{soc}\, \omega t + C_2 \cos(\omega t - \phi) + C_3 \cos(\omega t + \phi) + C_4 \cos(\omega t - \Delta T_o - \phi) \quad (2)$$

$$S_3 = C_1 \cos \omega t + C_2 \cos(\omega t - \phi) + C_3 \cos(\omega t + \phi) + C_4 \cos(\omega t + \Delta T_o - \phi) \quad (3)$$

$$S_4 = C_1 \cos \omega t + C_2 \cos(\omega t + \phi) + C_3 \cos(\omega t - \phi) + C_4 \cos(\omega t - \Delta T_o + \phi) \quad (4)$$

In the above equations, $C_1$, $C_2$, $C_3$ and $C_4$ are constants determined by the structure of pit or the optical system of the pickup, respectively.

Because $\Delta T_o$ is equal to zero at the optimum tracking, the above equations (1) to (4) are written as follows:

$$S_1 = C_1 \cos \omega t + (C_2 + C_4) \cos(\omega t + \phi) + C_3 \cos(\omega t - \phi) \quad (5)$$

$$S_2 = C_1 \cos \omega t + (C_2 + C_4) \cos(\omega t - \phi) + C_3 \cos(\omega t + \phi) \quad (6)$$

$$S_3 = C_1 \cos \omega t + (C_2 + C_4) \cos(\omega t - \phi) + C_3 \cos(\omega t + \phi) \quad (7)$$

$$S_4 = C_1 \cos \omega t + (C_2 + C_4) \cos(\omega t + \phi) + C_3 \cos(\omega t - \phi) \quad (8)$$

In this invention, an approach is employed to detect a phase difference between the sum total signal $S_5 = S_1 + S_2 + S_3 + S_4$ and an arbitrary light output signal $S_1$ of the quadrant-separated photo detector 14 to use the result obtained by adding, to the above phase difference, a phase difference between the sum total signal $S_5 = S_1 + S_2 + S_3 + S_4$ and a light output signal $S_3$ located at the position diagonal to the signal $S_1$. Thus, disturbance of a tracking control signal due to any scratch or stain on the disk surface can be reduced. This will be described in more detail in conjunction with the vector diagram.

Figure 6:
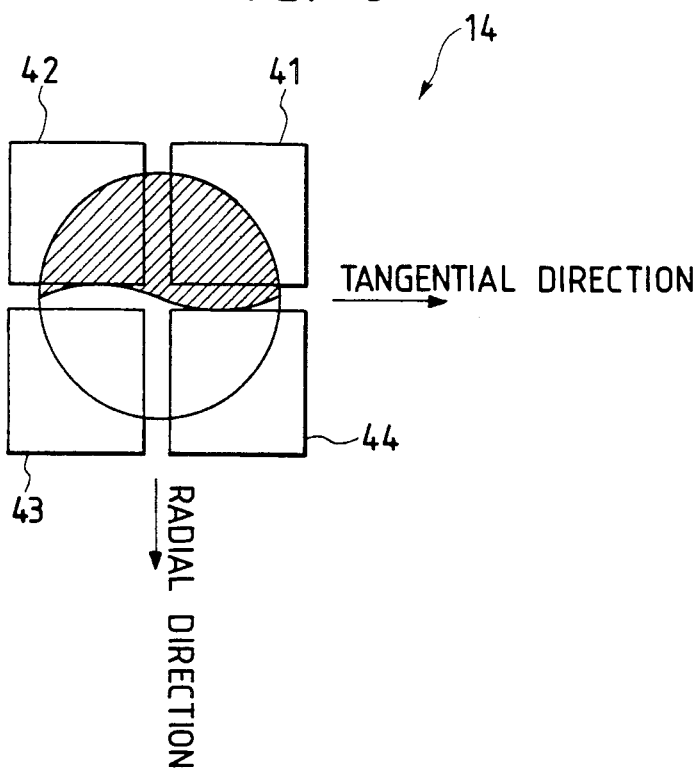
FIG. 6 is a view showing changes in light quantity on the photo detector when a laser light is passed through a scratched or stained portion on the optical disk.
Figure 10:
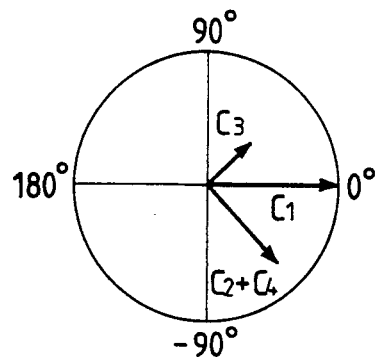
Figure 10I:
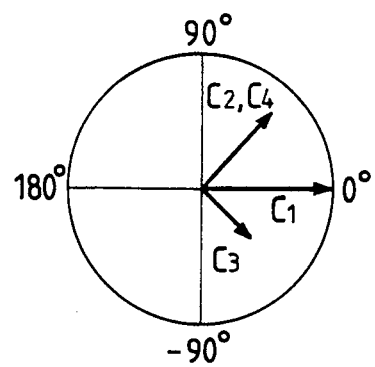
Figure 10:
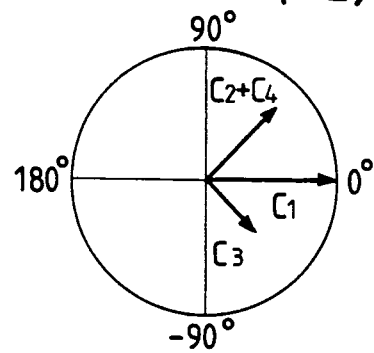
Figure 11A:
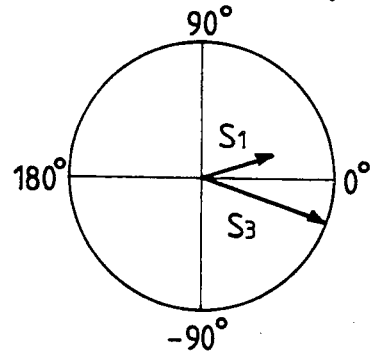
FIGS. 11 (A) and (B) are vector diagrams showing light output signals in respective diagonal directions when a laser light is passed through a scratched or stained portion on the disk, respectively.
Figure 11B:
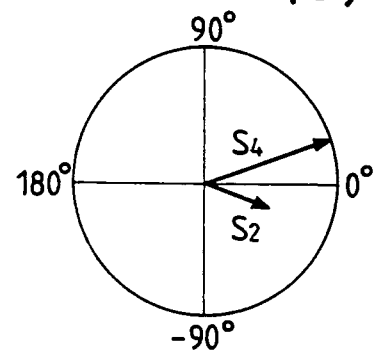

Namely, this apparatus is assumed to be in an optimum tracking state where there is no scratch or stain on the disk surface. In this condition, phase compared results between the quandrant-separated photo detector output signals $S_1$, $S_2$, $S_3$ and $S_4$ and the sum total signal are indicated by the vector diagrams (I) to (IV) in FIG. 10, respectively. In this case, FIGS. (I), (II), (III) and (IV) represent light output signals $S_1$, $S_2$, $S_3$ and $S_4$, respectively. In respective signals $S_1$ to $S_4$, an angle formed by sum of three vectors provides a phase difference. Respective vectors correspond to respective terms of the equations (5) to (8), and $C_1$ to $C_4$ of FIG. 10 indicate the magnitudes of vectors. In the optimum tracking state, the direction of the sum total of respective three vectos of $S_1+S_3$ and $S_2+S_4$ indicates zero degrees because respective resultant vectors of $S_1+S_3$ are symmetrical to respective resultant vectors of $S_2+S_4$. It is now assumed that a laser beam traces a scratched or stained portion on the disk surface, so there occurs any change in the light quantity on the quadrant-separated photodetector. For example, where a light quantity is decreased as shown in FIG. 6, the directions of the vectors $S_1$ and $S_2$ do not indicate zero degrees as shown in FIGS. 11(A) and 11(B). This consitutes the cause to generate a tracking error although the apparatus is in an optimum tracking state.

On the other hand, since the sum total signal $S_5=S_1+S_2+S_3+S_4$ of the quadrant-separated photo detector 14 has not phase information relating to the radial direction (disk radial direction), even in the case where a laser light is transmitted through a scratched or stained portion on the disk surface, so a light quantity is decreased as shown in FIG. 6, the direction of the sum total signal is maintained at an angle of zero degrees. Further, the magnitudes of the resultant vector of three vectors of $S_1$ and the resultant vector of three vectors of $S_3$ change by a change in the light quantity, but indicate the sam direction. Accordingly, even if a light quantity on the photo director varies by a scratch or stain on the dick surface as shown in FIG. 6, the result obtained by adding the phase compared result between the sum total signal and $S_1$ and the phase compared result between the sum total signal and $S_3$ becomes equal to zero.

Figure 12A:
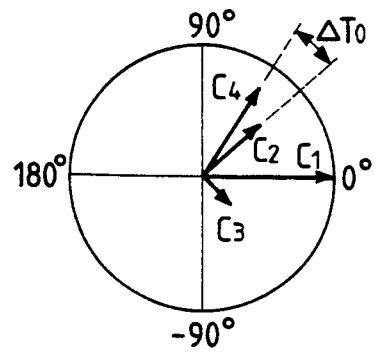
FIGS. 12 (A) and (B) and 13 (A) and (B) are vector diagrams showing the operation of this invention, respectively.
Figure 12B:
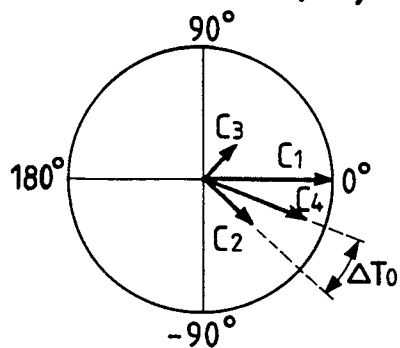
Figure 13A:
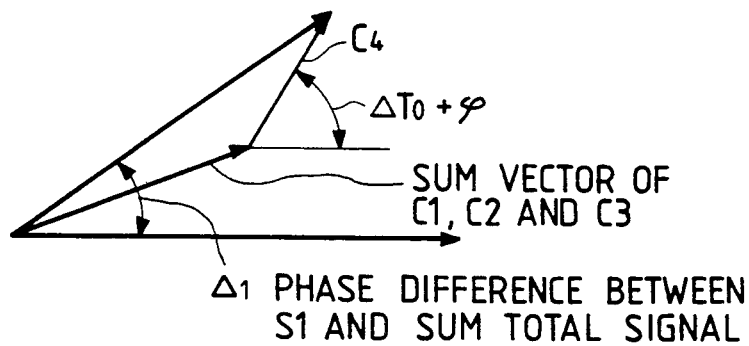
Figure 13B:
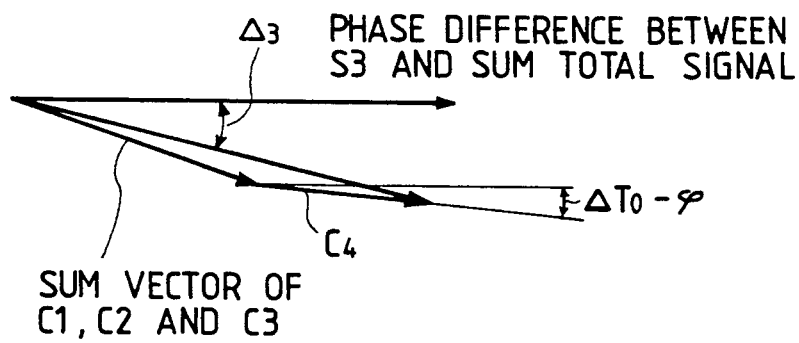

The fact that the result obtained by adding the phase compared result between the sum total signal and $S_1$ to the phase compared result between the sum total signal and $S_3$ indicates a tracking error will now be described with reference to FIG. 12. FIGS. 12(A) and 12(B) show, as the vector diagrams, signal changes of $S_1$ and $S_3$ in the case where there is a tracking error, respectively. Namely, FIG. 12(A) shows a light output $S_1$ and FIG. 12(B) shows a light output $S_3$. Further, FIGS. 13(A) and 13(B) shows resultant vectors obtained by carrying out a vector summation in FIGS. 12(A) and 12(B), respectively. With an increase in the tracking error, an angle indicated by $\Delta To$ in FIGS. 12(A) and 12(B) increases. At this time, the result of phase comparison between $S_1$ and the sum total signal $S_1+S_2+S_3+S_4$ is indicated as an angle defined by the resultant vector of four vectors shown in FIG. 13(A). In this instance, the vector $C_4$ rotates in a positive or negative direction with an increase in the tracking error. The resultant vectors of $S_1+S_3$ when the tracking error is equal to zero are symmetrical with result to an angle of zero degrees. Thus, the tracking control signal also becomes equal to zero. When any tracking error takes place, as $\Delta To$ increase in a positive direction, angles defined by resultant vectors of $S_1$ and $S_3$ both increase. On the contrary, when $\Delta To$ increases in a negative direction, angles defined by the resultant vectors of $S_1$ and $S_3$ both decrease. Accordingly, the result obtained by adding the angle defined by $S_1$ and the angle defined by $S_3$ becomes equal to a value corresponding to a tracking error. Namely, the result obtained by adding the phase compared result $\Delta_1$ between the sum total signal $S_1+S_2+S_3+S_4$ and $S_1$ and the phase compared result $\Delta_3$ between the sum total signal $S_1+S_2+S_3+S_4$ and $S_3$ indicates a tracking error.

While an approach is employed in the above-described embodiment to add the results obtained by making phase comparisons between light output signals $S_1$ and $S_3$ from detectors 41 and 43 located at diagonal positions of the quadrant-separated photo detector 14 and the sum total signal $S_1+S_2+S_3+S_4$, respectively, thus to detect a tracking control signal $S_{30}$, an approach may be employed to add the results obtained by making phase comparisons between light output signals $S_2$ and $S_4$ located at the other diagonal positions, thereby making it possible to provide a tracking control signal similar to the above.

Further, if a partial sum signal of a pair of adjacent pair of subdetectors, which is expressed as $S_1+S_2$ or $S_3+S_4$ in place of the sum total signal $S_5=S_1+S_2+S_3+S_4$ used in the above-described embodiment, effects and/or advantages similar to the above can be provided. $S_1+S_2$ or $S_3+S_4$ will be referred to as an adjacent sum signal hereinafter.

As described above, in accordance with the preferred embodiment of this invention, an approach is employed to add the results obtained by making phase comparison between light output signals from detectors located at diagonal positions of the quandrant-separated subdetectors of the photo detector to the sum total signal, respectively, thereby making it possible to output a tracking control signal. Accordingly, even in the case where there is a scratch or stain on the surface of the optical information reading disk, a stable tracking control signal can be advantageously provided without supplementing special optical parts.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. In an optical information reading apparatus comprising light beam irradiation means for irradiating a light beam onto a signal track on an information recording surface of an information recording medium, photo detector means including quandrant-separated subdetectors for applying photoelectric conversion to a reflected light beam from said information recording surface to output electric signals, and tracking control means for conducting a follow-up control of an irradiation position onto said track of the light beam from said light beam irradiation means on the basis of said electric signals, the improvement in which said tracking control means includes:

a first adder for adding all electric signals outputted from said quandrant-separated subdetectors;

a first phase comparator for making a phase comparison between a first electric signal outputted from one of a pair of subdetectors located at diagonal positions of said quandrant-separated subdetectors of said photo detector means and a sum total signal of electric signals outputted from said first adder to output a first phase compared result signal;

a second phase comparator for making a phase comparison between a second electric signal outputted from the other of subdetector located at said diagonal positions and said sum total signal to output a second phase compared result signal; and a second adder for adding said first and second phase compared result signals to output a tracking control signal.

2. An optical information reading apparatus as set forth in claim 1, wherein said first adder outputs a radio frequency signal for information recorded on an optical disk.

3. A optical information reading apparatus as set forth in claim 1, wherein said tracking control means includes a waveform shaping circuit for shaping waveforms of said sum total signal and said first and second electric signals.

4. In an optical information reading apparatus comrpising light beam irradiation means for irradiating a light beam onto a signal track on an inforamtion recording surface of an information recording medium, photo detector means including quadrant-separated subdetectors for applying photoelectric conversion to a reflected light beam from said information recording surface to output electric signals, and tracking control means for conducting a follow-up control of an irradiation position onto said track of the light beam from said light beam irradiation means on the basis of said electric signals, the improvement in which said tracking control means includes:

a first adder for adding all electric signals outputted from said quandrant-separated sub detectors;

a first phase comparator for making a phase comparison between a first electric signal outputted from one of a pair of subdetectors located at diagonal positions of said quandrant-separated subdetectors of said photo detector means and an adjacent sum signal of electric signals outputted from a pair of adjacent subdectectors of said quadrant-separated subdectectors to output a first phase compared result signal;

a second phase comparator for making a phase comparison between a second electric signal outputted from the other of said subdetectors located at said diagonal positions and said adjacent sum signal to output a second phase compared result signal; and a second adder for adding said first and second phase compared result signals to output a tracking control signal.

5. An optical information reading apparatus as set forth in claim 4, wherein said first adder outputs a radio frequency signal for information recorded on an optical disk.

6. An optical information reading apparatus as set forth in claim 4, wherein said tracking control means includes a waveform circuit for shaping waveforms of said adjacent sum signal and said first and second electric signals.

* * * * *